United States Patent [19]

Leyes et al.

[11] Patent Number: 5,234,261
[45] Date of Patent: Aug. 10, 1993

[54] MULTIPLEXING ANTILOCK BRAKE APPLY CHANNELS

[75] Inventors: Annabelle E. Leyes, Northville, Mich.; Dale J. Kumke, Kokomo; Fred J. Horner, Noblesville, both of Ind.; Donald E. Schenk, Vandalia; Donald L. Parker, Middletown, both of Ohio

[73] Assignees: General Motors Corporation, Detroit, Mich.; Delco Electronics Corp., Kokomo, Ind.

[21] Appl. No.: 987,102

[22] Filed: Dec. 7, 1992

Related U.S. Application Data

[63] Continuation of Ser. No. 721,333, Jul. 1, 1991, abandoned.

[51] Int. Cl.⁵ .............................................. B60T 8/58
[52] U.S. Cl. .................................. 303/100; 303/115.1
[58] Field of Search ............... 303/100, 102, 103, 111, 303/113.1, 113.4, 115.1, 116.1, DIG. 3, DIG. 4; 364/426.02

[56] References Cited

U.S. PATENT DOCUMENTS

| | | | |
|---|---|---|---|
| 4,022,514 | 5/1977 | Kondo et al. | 303/115 |
| 4,418,966 | 12/1983 | Hattwig | 303/DIG. 4 X |
| 4,657,310 | 4/1987 | Klein | 303/DIG. 4 X |
| 4,812,777 | 3/1989 | Shirai | 303/115 PP X |
| 4,852,451 | 8/1989 | Matsuda | 303/108 |
| 4,930,845 | 6/1990 | Bleckmann et al. | 303/100 |

Primary Examiner—Robert J. Oberleitner
Assistant Examiner—Lee W. Young
Attorney, Agent, or Firm—Howard N. Conkey

[57] ABSTRACT

An ABS system has a plurality of brake channels receiving apply pressure directly from a pump without an accumulator during ABS operation. To assure sufficient pressure for all channels during ABS reapply modes the channels are multiplexed to apply one at a time and keeping on hold other channels scheduled for apply. Several states of brake application are identified and the states are prioritized for each channel so that the multiplexing is ordered according to channel priority.

3 Claims, 10 Drawing Sheets

MULTIPLEXING ANTILOCK BRAKE APPLY CHANNELS

This is a continuation of application Ser. No. 07/721,333 filed on Jul. 1, 1991, now abandoned.

FIELD OF INVENTION

This invention relates to antilock brake operation in a system with a plurality of channels and particularly to a method of multiplexing reapply pressure to the channels.

BACKGROUND OF THE INVENTION

Automotive brake systems have at least two channels for supplying brake pressure to the wheel brakes so that in the event of a failure in one channel, another channel will be operable to furnish braking to some of the wheels. The channels are configured in many ways such as one channel for front wheels and another for rear wheels, or one channel for each front wheel and another for rear wheels, or a diagonal split configuration. Ordinary brake systems supply these channels from pressure developed in a master cylinder which is usually augmented by a pressure booster arrangement. When the master cylinder is operated by the driver depressing the brake pedal the brakes are applied and remain applied until the pedal is released.

Antilock braking systems typically add to the ordinary brake function the ability to sense when wheel slip occurs and then release pressure to the slipping wheel and later reapply pressure when the wheel speed recovers. Also a pressure hold function is sometimes used in the antilock operation. To assure an adequate supply of brake pressure a separate pump may be used during antilock operation as a source of reapply pressure. A challenge in designing such systems is to provide a pump which is both economically feasible and adequate to provide the brake pressure demands of all the channels. An economical pump can supply a single channel but the simultaneous pressure application in more than one channel can not be assured. To assure a sufficient pressure supply an accumulator may be used to store pressurized brake fluid but this is an expensive solution to the problem. It is preferable to assure adequate pressure without the luxury of an accumulator.

SUMMARY OF THE INVENTION

It is therefore an object of the invention to provide a method of reliably supplying a plurality of brake channels for brake reapply with direct pressure from a pump.

The invention is carried out in a wheel lock control system having several brake pressure supply channels fed by a single pressure source during antilock operation and including the ability to hold an existing brake pressure, by the method of applying pressure to the several channels comprising the steps of: selecting one channel; applying brake pressure to the selected channel; holding the existing pressure on non-selected channels; and repeatedly changing the selected channel; whereby pressure is applied from the source to only one channel at a time and each channel receives pressure in turn.

BRIEF DESCRIPTION OF THE DRAWINGS

The above and other advantages of the invention will become more apparent from the following description taken in conjunction with the accompanying drawings wherein like references refer to like parts and wherein:

FIGS. 7 through 11A and 11B are flow charts detailing the multiplexing routine of the algorithm of FIG. 5, and FIGS. 12 through 14 are pressure pulse diagrams illustrating the multiplexing operation according to the invention.

DESCRIPTION OF THE INVENTION

For purposes of disclosing the invention, an anti-lock brake system (ABS) for operating a three channel brake system with a channel for each front wheel and a channel for the pair of rear wheels is described. It will be appreciated, however that the invention is also applicable to other channel configurations.

Figure 1:
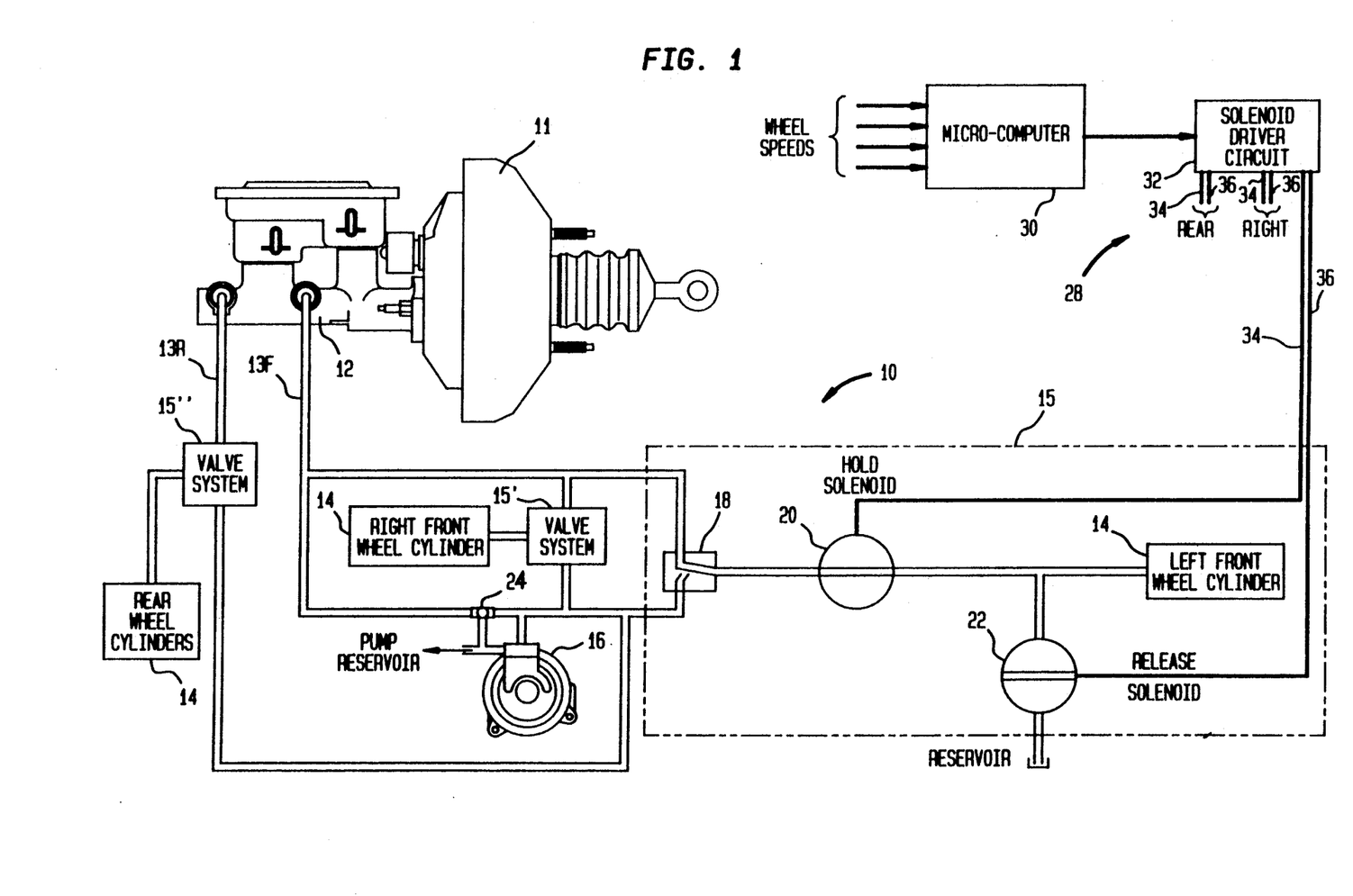
FIG. 1 is a diagram of a brake hydraulic system and electronic control for antilock braking for implementing the subject invention.

FIG. 1 shows the hydraulic braking system 10 which features a master cylinder 12 with a vacuum booster 11 for supplying brake pressure to the wheel cylinders 14 of the front wheel and rear wheel brakes through separate lines 13F and 13R respectively. An electrohydraulic pump 16 also supplies brake pressure to the wheel cylinders during the reapply mode, the pump being turned on only during ABS mode. A valve system 15 including an isolation valve 18, a hold solenoid valve 20 and a release solenoid valve 22 selectively couples the master cylinder and the pump to the left front wheel and controls release and reapply of brake pressure. Similar valve systems 15' and 15" connect the pump 16 and master cylinder 12 to the right front wheel and to the rear wheels, respectively, thereby defining three distinct channels. A pressure equalizing valve 24 is connected between the pump 16 and the master cylinder 12 to assure that the pump pressure does not exceed the master cylinder pressure. The isolation valve 18, as is well known in the art, is operated by the wheel cylinder pressure and the pump pressure such that for non-ABS braking, the master cylinder pressure is coupled to the wheel cylinder 14, and for ABS braking, the pump 16 is connected to the wheel cylinder.

Figure 2:
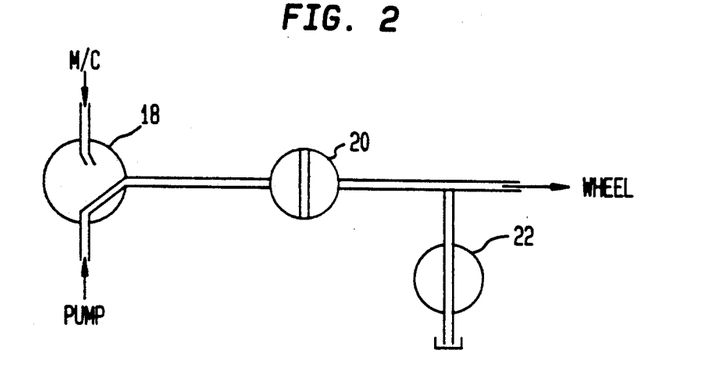
FIGS. 2 through 4 are hydraulic diagrams of the valve systems of FIG. 1 in different control configurations.
Figure 3:
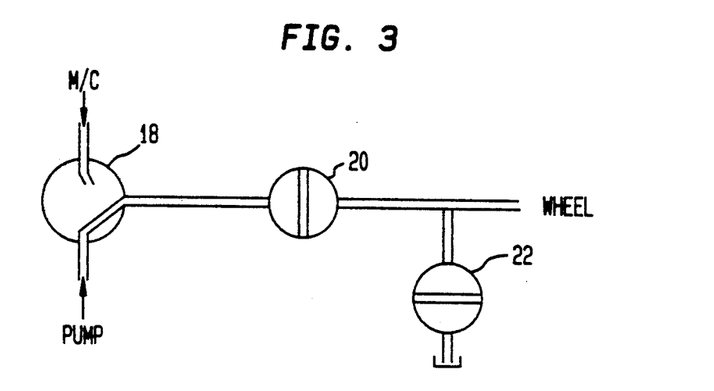
Figure 4:
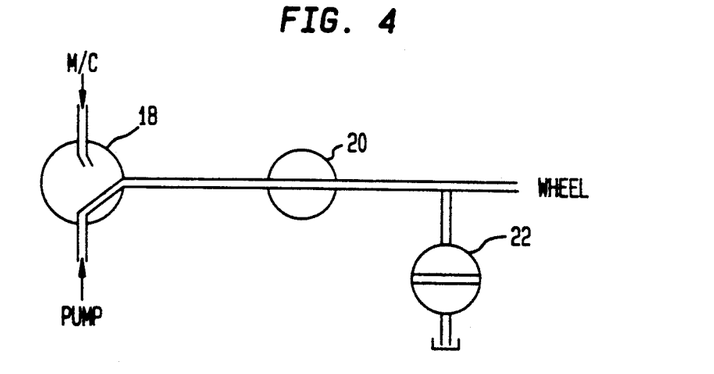

In FIG. 1 the valve system 15 is shown in the non-ABS condition wherein the isolation valve 18 connects, the master cylinder front brake line 13F through the open hold solenoid valve 20 to the wheel cylinder 14 and the release solenoid valve 22 is closed. Thus the master cylinder pressure is directly coupled to the wheel cylinder 14. FIGS. 2–4 show the ABS condition when the pump 16 is turned on and the isolation valve 18 isolates the master cylinder from the wheel cylinder and connects the pump pressure in its place. FIG. 2 shows the release mode wherein the hold valve 20 is closed and the release valve 22 is open to release brake pressure from the wheel cylinder. FIG. 3 shows the hold mode wherein both valves 20 and 22 are closed to maintain the pressure that existed when the valves both became closed. Finally, FIG. 4 shows the reapply mode wherein the hold valve 20 is open and the release valve 22 is closed so that the pump pressure is coupled to the wheel cylinder.

The electronic control 28 for the antilock brake system includes a microcomputer 30 having wheel speed inputs from all the wheels and an output which controls a solenoid driver circuit 32 which has an output line 34 to each hold solenoid 20 and an output line 36 to each release solenoid 22 to accomplish braking functions as ordered by the microcomputer 30. According to this invention the microcomputer is programmed to control ABS operation for each channel by operating the valves in such a manner that when a release or hold mode is commanded for any channel it is performed irrespective of the status of other channels and when a reapply mode is commanded for more than one channel it is performed for only one channel at a time.

Figure 5:
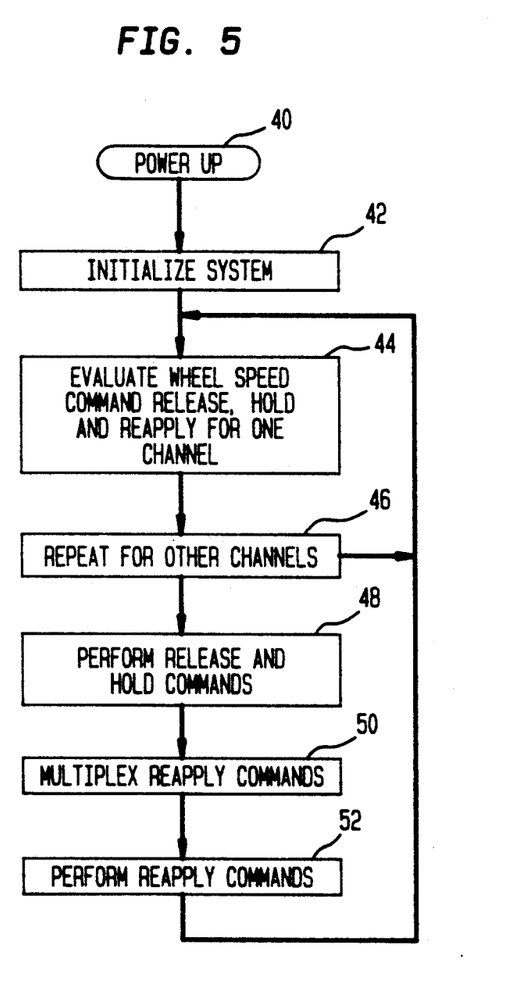
FIG. 5 is a flow chart showing the overall antilock brake control algorithm used in the control of FIG. 1.

The flow chart of FIG. 5 illustrates the overall program for ABS control. Reference numerals nn on the flow chart blocks are use in angle brackets <nn> to refer to the function of the corresponding blocks. Upon power up <40> when the vehicle ignition is first turned on, the microcomputer 30 performs system initialization <42> which entails clearing registers, initializing specific variables to calibrated values, stabilizing voltage levels and performing other basic functions of a digital computer. Wheel speed commands are received and evaluated to determine according to a well known algorithm whether ABS operation is required and if so, whether the brake of a given wheel should be in a release, hold or reapply mode. The selected mode is commanded <44> and the same routine is repeated for each wheel set <46> until each front wheel and the rear wheel commands are determined. Commands for release and hold functions are performed without further ado by activating the solenoid driver to energize the appropriate valves <48>. Reapply commands, however, are multiplexed <50> and then performed <52> to assure that only one wheel set or channel at a time draws on the pump output so that ample pump pressure will be available. The blocks 44 through 52 are repeated at 10 msec loop intervals.

Figure 6:
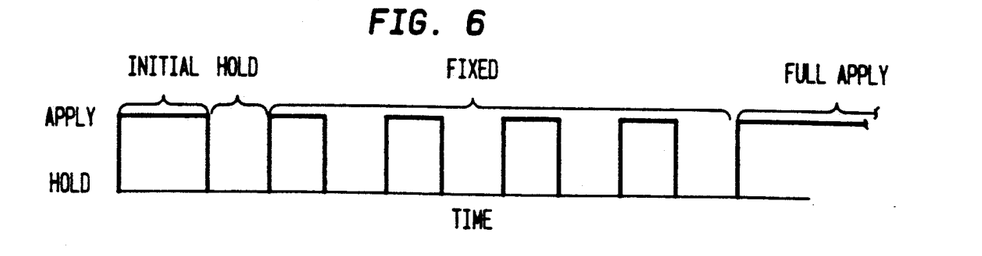
FIG. 6 is a diagram illustrating antilock braking pressure pulses.

The basic algorithm for routine 44 senses when a wheel slip limit has been reached for a particular wheel set and commands ABS operation for that wheel. The determination of brake mode is made by a look-up table addressed by wheel acceleration and slip. Empirically determined set points for acceleration and slip identify table cells which specify the brake mode. When a wheel slip limit is identified a brake release mode is commanded. When wheel speed recovery is sensed brake reapplication is effected by a "step-up" process which applies pressure in timed steps. First, an initial apply command is given which affords a pressure pulse lasting for a period (determined from a table) to ramp up the brake pressure at a high rate. The prescribed period is selected to allow the pressure to build up to approximately the desired pressure. As shown in FIG. 6, the initial apply pulse is followed by a hold period and then a series of fixed pulses alternated with variable hold periods to ramp up the pressure at a low rate to achieve the desired pressure. For example, the initial apply command may be for 25 followed by a hold period of 65 msec. Then the fixed pulses may be a series of 12 msec pulses separated by 78 msec hold periods. Finally, full apply is commanded when a set number of fixed pulses are issued. Generally the full apply occurs when the vehicle has nearly come to a stop or when the brake pedal pressure has been relieved. When one wheel channel is in the reapply mode this sequence of pulses can be performed without interruption. On the other hand, when two or more channels are in reapply mode, another scheme is needed to coordinate the pulses so that they take turns according to importance.

Along with identifying three modes of brake application, i.e., initial pulse, fixed pulse, and full apply, each mode can be further categorized according to its stage of progress. If a mode has been commanded but not yet begun, it is considered to be "needed". If a commanded mode has begun, it is considered to be "in progress". Further, in the case of initial pulses and full apply, the application period may exceed a preset amount and is then considered to be "> MAXIP" or "> MAXAPP", respectively. The constants MAXIP and MAXAPP each may be on the order of 20 msec. Each of these categories or states is assigned a priority value and is used to determine which should take precedence over another when multiplexing the reapply operations.

Figure 7:
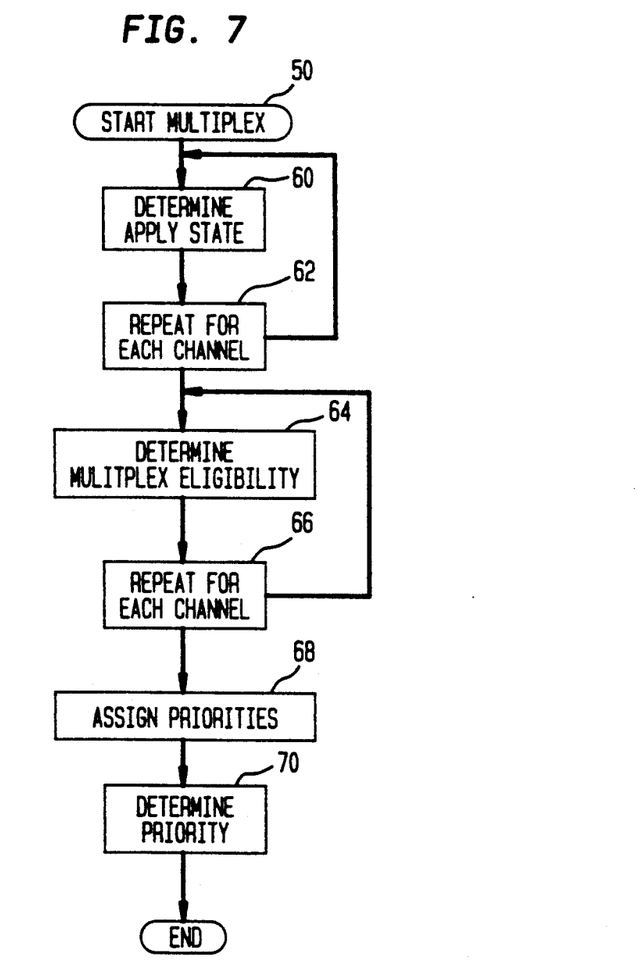

FIG. 7 elaborates on the multiplex subroutine 50 of FIG. 5. The apply state of one of the channels is determined <60> and this is repeated for all the channels <62>. Then the eligibility of a channel for multiplexing is determined <64> and this is repeated for each channel <66>. A priority ranking is assigned to each state for each channel <68> and the channel having the highest priority current state is selected <70>, allowing it to go into an apply mode and forcing other eligible channels into a hold mode.

Figure 8:
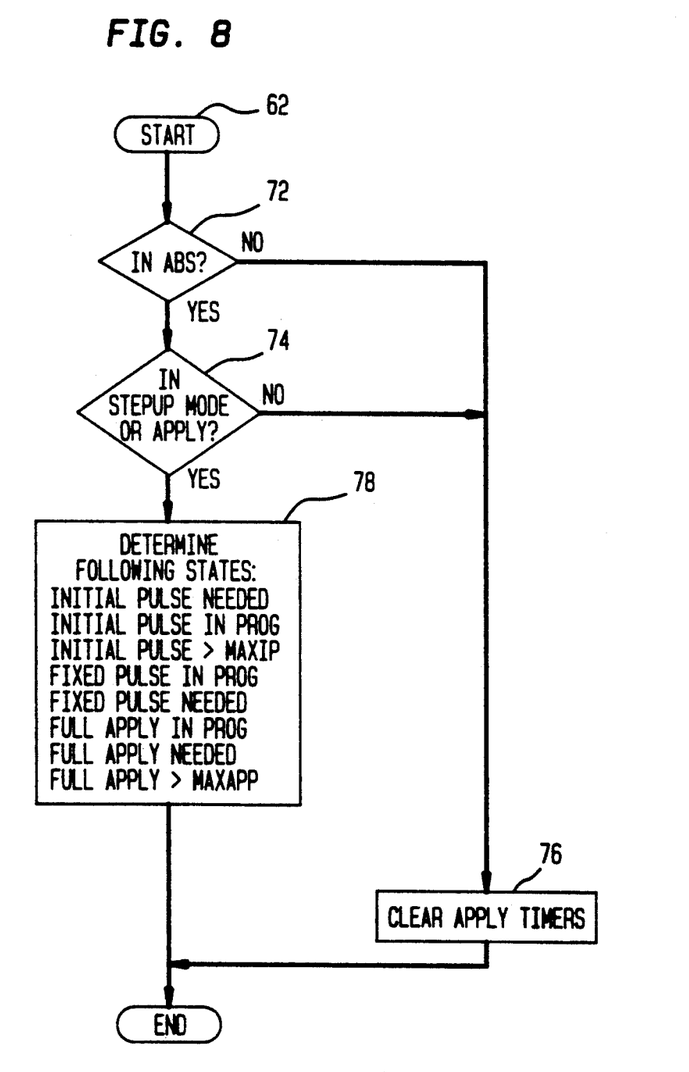

FIG. 8 shows the determination of the apply state subroutine 62 for one brake channel. If the channel is not in ABS mode <72> or is not in step-up or apply mode <74>, apply timers are cleared <76> and the subroutine ends. The apply timers are used to measure the progress of the full apply mode or the initial pulse. If the channel is in step-up or full apply mode <74> the state is determined <78> and the subroutine ends. Eight different states are possible: initial pulse needed, in progress or > MAXIP; fixed pulse needed or in progress; and full apply needed, in progress, or > MAXAPP.

Figure 9:
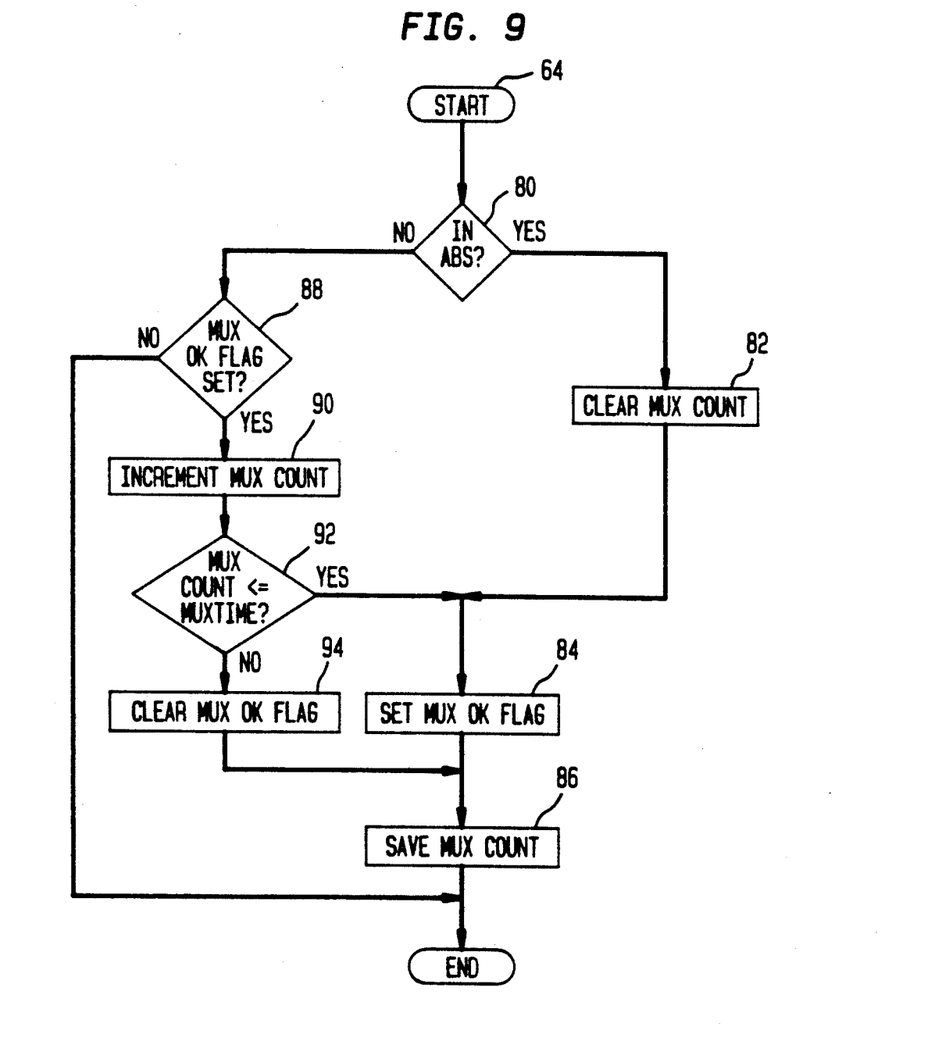

FIG. 9 shows the subroutine 64 for determining the eligibility of each channel for multiplexing. Multiplexing is permitted when the channel is in the ABS mode and for a short period following the termination of ABS mode; a MUX OK flag is set to indicate the eligibility. When the ABS mode terminates the isolation valve changes state to connect the master cylinder to the brake channel so that multiplexing is no longer appropriate. A short delay period following the ABS mode assures that the isolation valve has had time to complete the change. The program loops are counted as MUX COUNT to determine the time elapsed after leaving the ABS mode. If the channel is in ABS 80> the MUX COUNT is cleared <82>, a MUX OK flag is set <84> and the MUX COUNT is saved <86>. If the channel is not in ABS <80> and the MUX OK flag is set <88>, the count is incremented <90> and compared with a constant MUXTIME <92> which may be set at 5 loops, for example. If MUX COUNT is less than or equal to MUXTIME <92> the MUX OK flag is set <84> and the MUX COUNT is saved <86>. If the count is greater than MUXTIME, the MUX OK flag is cleared <94> and the count is saved <86>. When the MUX OK flag is not set <88>, the program goes to the end of the subroutine 64.

Figure 10:
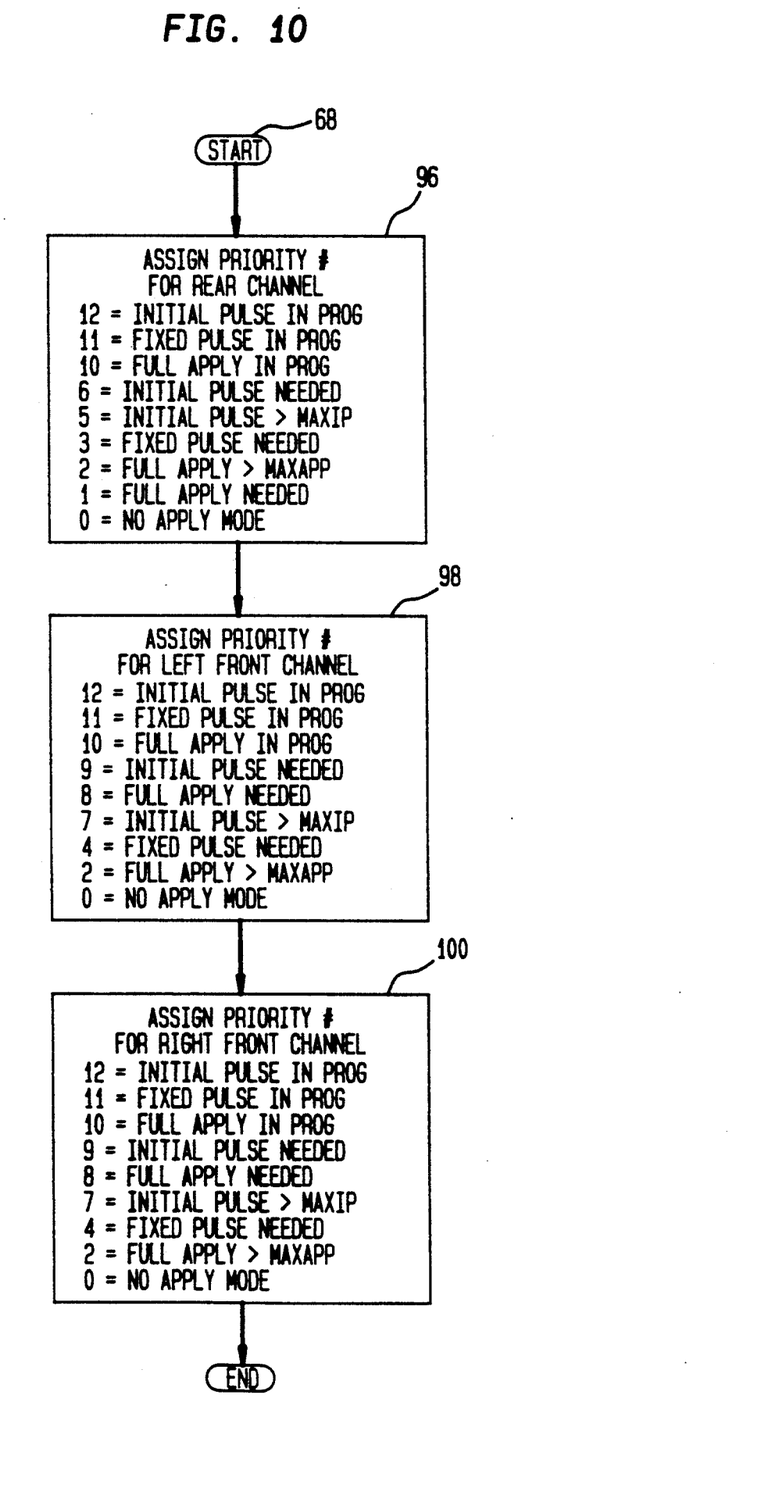

The subroutine 68 for assigning priorities to the various states is shown in FIG. 10. Priority ranks of 0 to 12 are assigned where 0 is the lowest priority and is assigned to a "no apply" state. The highest priority is 12 and is assigned to the "initial pulse, in progress" state for each channel. Block 96 sets forth the priorities assigned to the states in the rear channel, while blocks 98 and 100 show the priority assignments for the left front and right front channels respectively. The assignments for the two front channels are identical. The rear channel however has its states ranked lower than corresponding front channel states except for "in progress" and "full apply>MAXAPP" states which are of equal rank for front and rear channels.

Figure 11A:
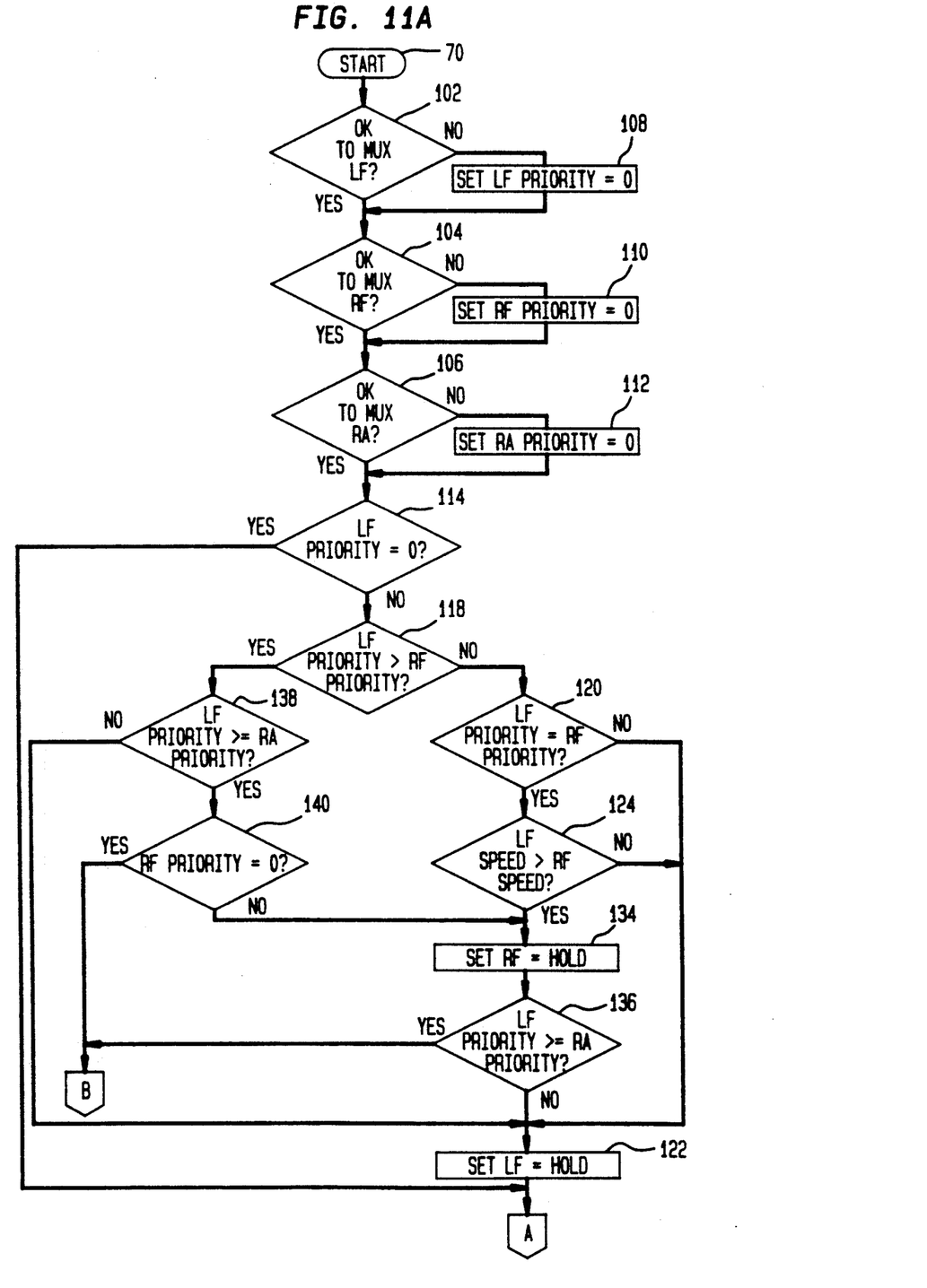
Figure 11B:
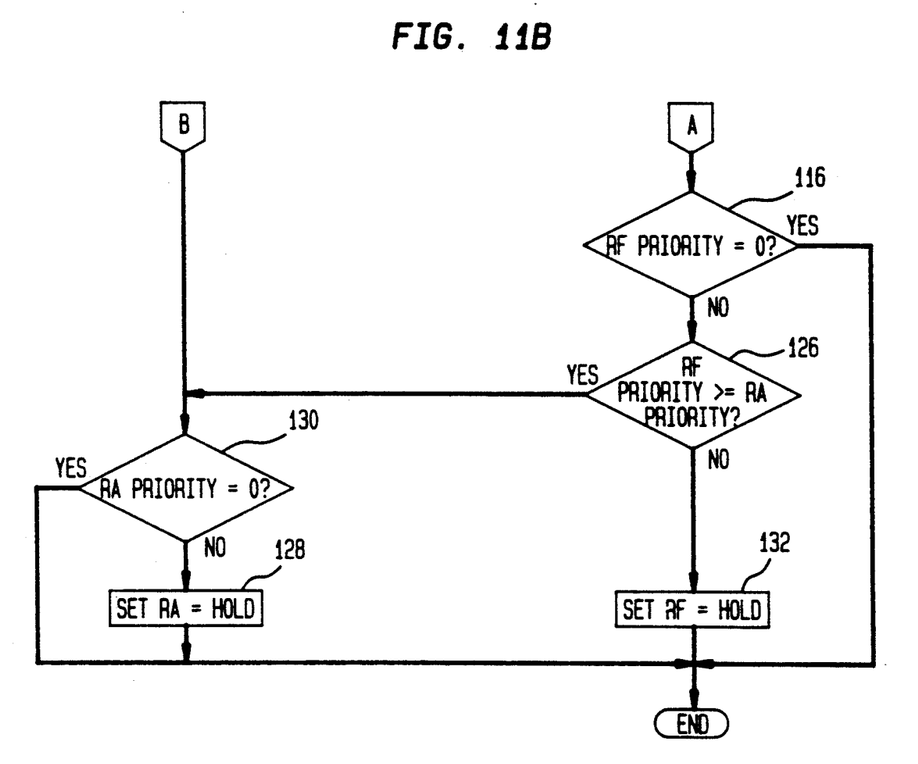

FIGS. 11A and 11B show a flow chart in two parts which are connected at points A and B. The flow chart is for the subroutine 70 to determine priority. The scheme of the routine is to set a priority of 0 to those channels not allowed to multiplex, and of those that may multiplex, to assign the lower priority channels to hold condition. By default, the remaining channel not on hold is activated to carry out or continue its commanded apply function. The program checks the MUX OK flag for each channel <102>, <104>, and <106> and sets the priority to 0 for any channel which is not allowed to multiplex <108>, <110>, and <112>. If the left front (LF) priority is 0 <114> and the right front (RF) priority is 0 <116> the routine ends with no multiplexing decision since none is needed for the single remaining channel. If LF is not 0 <114< and LF priority is not greater than RF priority <118>, and LF priority is not equal to RF priority <120>, the LF channel is set to hold <122>. Where RF and LF priorities are equal <120>, the wheel speeds are compared <124>. If LF speed is not greater than the RF speed the LF channel is set to hold <122>. Then if RF priority is not 0 <116> and RF priority is greater than or equal to RA priority <126>, the rear channel is set to hold <128> (unless RA priority equals 0 <130>) to allow the RF channel to apply. When RF priority is not greater than or equal to RA priority <126>, the RF channel is set to hold <132> to allow the rear channel to apply.

Where the LF speed is greater than the RF speed <124> the RF channel is set to hold <134> and if LF priority is less than RA priority <136>, LF channel is also set to hold <122>, allowing the rear channel to apply, subject to the action of blocks 116, and 126-130. If in block 136 the LF priority is greater than or equal to the RA priority, the rear channel is set to hold <128> to allow the LF channel to apply. Thus when a front channel has priority equal to the rear channel, the front channel is given precedence.

In the case where LF priority is greater than RF priority <118>, the LF priority is less than the RA priority <138>, the LF channel is set to hold <122> and the rear channel will be applied subject to block 130. If LF priority is greater than or equal to the RA priority <138> and RF priority is 0 <140>, the RA channel is set to hold <128> subject to block 130 so that the LF channel is applied. If, however, the RF priority is not 0 <140>, the RF channel is set to hold <134> and the rear channel is set to hold <128> subject to block 130 to allow the LF channel to be applied.

The result of the prioritization system is that in each computer control loop the priority states are reassessed to allow first one channel and then another to be applied. When the state of the applied or activated channel changes due to the progress of the apply stage, or when the state of another channel changes, the priority can change. Thus the channels take turns to interleave their apply periods, not according to a fixed rotation schedule but according to need as determined in each control loop.

Figure 12:
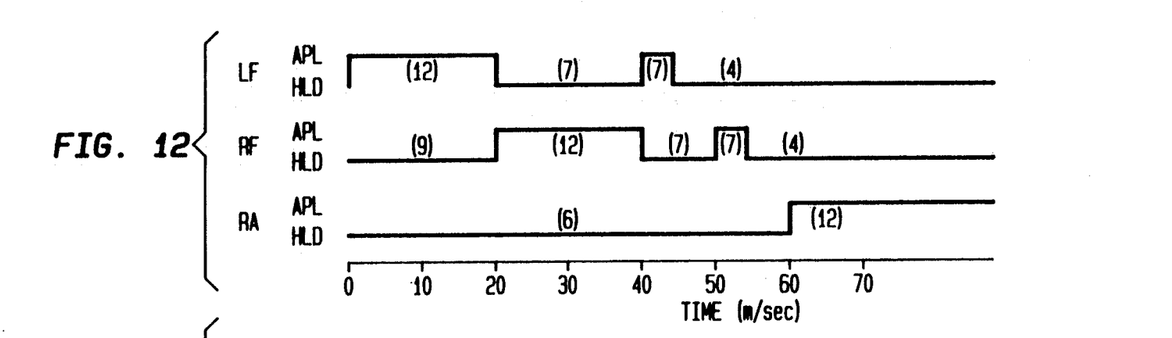

FIG. 12 graphically shows initial pulses applied by each channel where the initial pulse time is set at 25 msec and MAXIP is 20 msec. Assuming the LF channel has priority, it begins its initial pulse. Having begun, its priority is 12 and cannot be overcome by another channel. After 10 msec the RF and RA channels receive an initial pulse command. The RF channel has a priority of 9 (shown in parentheses) and the RA channel has a priority of 6 and they are put on hold. At 20 msec the LF initial pulse reaches MAXIP and its priority changes to 7, allowing the RF channel to begin its initial pulse to earn a priority of 12 and the LF channel is put on hold. At 40 msec the RF initial pulse reaches MAXIP and its priority becomes 7. The LF channel may prevail over the RF channel if its wheel speed is higher to complete the remaining 5 msec of its initial pulse; it would then be ready for a fixed pulse with a priority of 4. At the next loop (at 50 msec) the RF channel with a priority of 7 can complete the remainder of its initial pulse. Then, at time 60 msec the RA channel with a priority of 6 can begin its initial pulse and its priority then jumps to 12 to prevent interruption for 20 msec.

Figure 13:
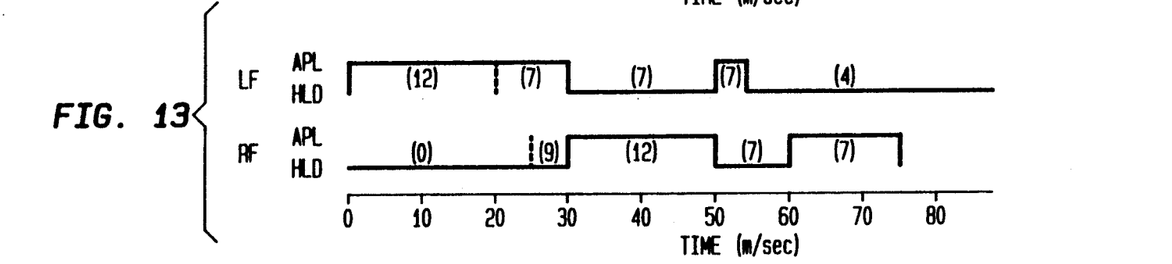

FIG. 13 provides an example involving only the front channels where the initial pulse length is 35 msec and the MAXIP is 20 msec. The LF channel has first begins an initial pulse and the RF channel doesn't receive an initial pulse command until 25 msec. Thus the LF channel is not interrupted until the next loop at 30 msec. When the RF initial pulse reaches MAXIP at 50 msec its priority drops and the LF initial pulse can be completed if LF speed is greater than RF speed. Then at 60 msec the RF initial pulse can resume to go to completion.

Figure 14:
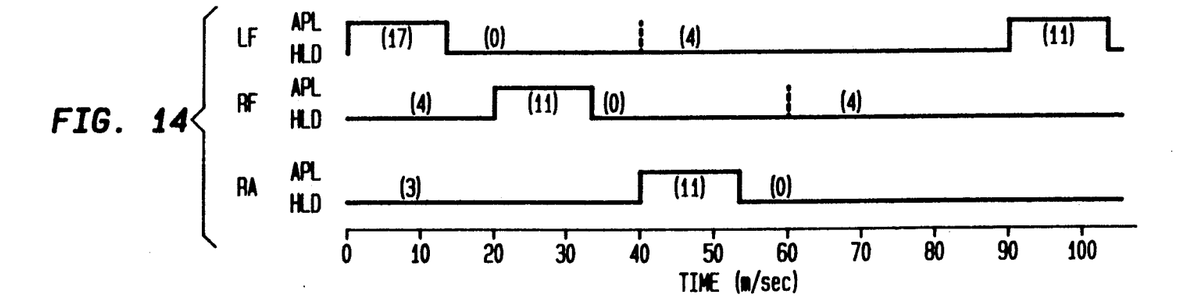

FIG. 14 shows the interleaving of fixed pulses in the three channels where the length of each fixed pulse is 12 msec and the hold period between pulses is preferably 78 msec. IF the LF fixed pulse starts first it will have a priority of 11 and cannot be interrupted by another pulse command. The RF channel fixed pulse command (priority of 4) and the RA channel fixed pulse command (priority of 3) occur later. When the LF fixed pulse expires its priority goes to 0 and at the next loop (20 msec) the RF channel begins its fixed pulse. Finally at 40 msec the RA channel fixed pulse gains priority (11) and begins. At the same time the LF channel is scheduled for another fixed pulse and gains a priority of 4. At 60 msec the LF channel is able to start its next fixed pulse, having had a hold period longer than the programmed value.

It will thus be seen that the multiplexing algorithm set forth herein provides a practical method of controlling a plurality of channels to take turns at applying pulses or full apply to use pressure directly from a pump without requiring an accumulator to augment the pressure needs.

The embodiments of the invention in which an exclusive property or privilege is claimed are defined as follows:

1. In a wheel lock control system for a brake system of a vehicle having a wheel lock control hydraulic pressure source, a hydraulic pressure reservoir, and several wheel brake channels, a method of controlling hydraulic brake pressure in the wheel brake channels for wheel lock controlled braking, the method comprising the steps of:

for each wheel brake channel, sensing a requirement for wheel lock controlled braking;

for each wheel brake channel for which the requirement for wheel lock controlled braking is sensed, repeatedly determining one of a pressure release, hold and apply mode;

when the pressure apply mode is concurrently determined for multiple wheel brake channels, sequentially selecting said multiple wheel brake channels one at a time and resetting the determined pressure apply mode of the other ones of said multiple wheel brake channels to the pressure hold mode to thereby limit the determined apply mode to a single brake channel at any given time; and concurrently:

(A) releasing hydraulic brake pressure to the hydraulic pressure reservoir from each of the wheel brake channels for which the pressure release mode is determined, (B) holding hydraulic brake pressure in each of the wheel brake channels for which the pressure hold mode is determined, and (C) supplying hydraulic brake pressure form the wheel lock control hydraulic pressure source to the wheel brake channel for which the pressure apply mode is determined.

2. In a wheel lock control system for a brake system of a vehicle having a wheel lock control hydraulic pressure source, a hydraulic pressure reservoir, and several wheel brake channels, a method of controlling hydraulic brake pressure int he wheel brake channels for wheel lock controlled braking, the method comprising the steps of:

for each wheel brake channel, sensing a requirement for wheel lock controlled braking;

for each wheel brake channel for which the requirement for wheel lock controlled baking is sensed, repeatedly determining one of a pressure release, hold and apply mode;

selecting one of the wheel brake channels for which the pressure apply mode is determined, all remaining ones of the wheel brake channels for which the pressure apply mode is determined comprising non-selected wheel brake channels;

simultaneously (A) releasing hydraulic brake pressure to the hydraulic pressure reservoir from each of the wheel brake channels of which the pressure release mode is determined, (B) holding hydraulic brake pressure in each of the wheel brake channels for which the pressure hold mode is determined, and (C) supplying hydraulic brake pressure form the wheel lock control hydraulic pressure source to the selected one of the wheel brake channels for which the pressure apply mode is determined;

holding hydraulic brake pressure in the non-selected wheel brake channels; and when the pressure apply mode is determined for multiple wheel brake channels, repeatedly changing the selected one of the wheel brake channels for which the pressure apply mode is determined to repeatedly change the wheel brake channel having a determined apply mode to which hydraulic brake pressure is supplied form the wheel lock control hydraulic pressure source.

3. In a wheel lock control system for a brake system of a vehicle having a wheel lock control hydraulic pressure source, a hydraulic pressure reservoir, and several wheel brake channels, a method of controlling hydraulic brake pressure in the wheel brake channels for wheel lock controlled braking, the method comprising the steps of:

for each wheel brake channel, sensing a requirement for wheel lock controlled braking;

for each wheel brake channel for which the requirement for wheel lock controlled braking is sensed repeatedly determining one of a pressure release, hold and apply mode;

assigning a unique apply priority to each one of the wheel brake channels having a determined pressure apply mode form a predetermined schedule of priorities varying progressively form a low priority to a high priority;

selecting the wheel brake channel having the highest one of the assigned priorities, all remaining ones of ht wheel brake channels for which the pressure apply mode is determined comprising non-selected wheel brake channels;

simultaneously (A) releasing hydraulic brake pressure to the hydraulic pressure reservoir from each of the wheel brake channels for which the pressure release mode is determined, (B) holding hydraulic brake pressure in each of the wheel brake channels for which the pressure hold mode is determined, and (C) supplying hydraulic brake pressure from the wheel lock control hydraulic pressure source to the selected wheel brake channel having the highest one of the assigned priorities; and holding hydraulic brake pressure in the non-selected wheel brake channels.

* * * * *